(12) United States Patent
Franchuk et al.

(10) Patent No.: US 7,689,687 B2
(45) Date of Patent: Mar. 30, 2010

(54) COMMUNICATION CONTROLLER WITH AUTOMATIC TIME STAMPING

(75) Inventors: Brian A. Franchuk, Richfield, MN (US); Roger R. Benson, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1633 days.

(21) Appl. No.: 10/903,317

(22) Filed: Jul. 30, 2004

(65) Prior Publication Data

US 2006/0026314 A1    Feb. 2, 2006

(51) Int. Cl.
*G06F 15/173* (2006.01)

(52) U.S. Cl. ............... 709/224; 709/201; 709/206; 709/207; 709/227

(58) Field of Classification Search ............... 709/201, 709/206, 207, 217, 224
See application file for complete search history.

(56) References Cited

U.S. PATENT DOCUMENTS

| | | | |
|---|---|---|---|
| 5,574,934 A * | 11/1996 | Mirashrafi et al. | 709/207 |
| 6,016,401 A | 1/2000 | Rostoker et al. | |
| 6,434,624 B1 | 8/2002 | Gai et al. | |
| 6,564,268 B1 | 5/2003 | Davis et al. | |
| 6,826,590 B1 * | 11/2004 | Glanzer et al. | 709/200 |
| 6,999,824 B2 | 2/2006 | Glanzer et al. | |
| 7,080,160 B2 * | 7/2006 | Cognet et al. | 709/248 |
| 2002/0073228 A1 * | 6/2002 | Cognet et al. | 709/236 |
| 2003/0093530 A1 * | 5/2003 | Syed | 709/226 |
| 2005/0240287 A1 * | 10/2005 | Glanzer et al. | 709/223 |

* cited by examiner

*Primary Examiner*—Phuoc Nguyen
(74) *Attorney, Agent, or Firm*—Kinney & Lange, P.A.

(57) ABSTRACT

Devices in a process control system communicate by data messages over a communication medium segment. Each device includes a communication controller that automatically time stamps events associated with received and transmitted messages.

23 Claims, 8 Drawing Sheets

COMMUNICATION CONTROLLER WITH AUTOMATIC TIME STAMPING

BACKGROUND OF THE INVENTION

The present invention relates to a communications controller for use in field instruments and other devices of process control systems. In particular, the present invention is a system and method for low latency data packet reception and processing in a communications controller.

In a typical industrial plant, a distributed control system (DCS) is used to control many of the industrial processes performed at the plant. Typically, the plant has a centralized control room having a computer system with user input/output (I/O), disc I/O, and other peripherals as are known in the computing art. Coupled to the computing system are a controller and a process I/O subsystem.

The process I/O subsystem includes I/O ports which are connected to various field devices throughout the plant. Field devices include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights. The term "field device" encompasses these devices, as well as any other device that performs a function in a distributed control system.

Traditionally, analog field devices have been connected to the control room by two-wire twisted pair current loops, with each device connected to the control room by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 milliamps running through the loop. An analog field device that transmits a signal to the control room modulates the current running through the current loop, with the current proportional to the sensed process variable. On the other hand, an analog field device that performs an action under control of the control room is controlled by the magnitude of the current through the loop, which is modulated by the I/O port of the process I/O system, which in turn is controlled by the controller. Traditional two-wire analog devices having active electronics can also receive up to 40 milliwatts of power from the loop. Analog field devices requiring more power are typically connected to the control room using four wires, with two of the wires delivering power to the device. Such devices are known in the art as four-wire devices and are not power limited, as are two-wire devices.

In contrast, traditional discrete field devices transmit or respond to a binary signal. Typically, discrete field devices operate with a 24-volt signal (either AC or DC), a 110- or 240-volt AC signal, or a 5-volt DC signal. Of course, a discrete device may be designed to operate in accordance with any electrical specification required by a particular control environment. A discrete input field device is simply a switch which either makes or breaks the connection to the control room, while a discrete output field device will take an action based on the presence or absence of a signal from the control room.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve between an open and closed position, inclusive, based on the magnitude of the current flowing through the two-wire twisted pair.

More recently, hybrid systems that superimpose digital data on the current loop have been used in distributed control systems. One hybrid system is known in the control art as the Highway Addressable Remote Transducer (HART) and is similar to the Bell 202 modem specification. The HART system uses the magnitude of the current in the current loop to sense a process variable (as in the traditional system), but also superimposes a digital carrier signal upon the current loop signal. The carrier signal is relatively slow, and can provide updates of a secondary process variable at a rate of approximately 2-3 updates per second. Generally, the digital carrier signal is used to send secondary and diagnostic information and is not used to realize the primary control function of the field device. Examples of information provided over the carrier signal include secondary process variables, diagnostic information (including sensor diagnostics, device diagnostics, wiring diagnostics, and process diagnostics), operating temperatures, temperature of the sensor, calibration information, device ID numbers, materials of construction, configuration or programming information, etc. Accordingly, a single hybrid field device may have a variety of input and output variables and may implement a variety of functions.

HART is an industry standard nonproprietary system. However, it is relatively slow. Other companies in the industry have developed proprietary digital transmission schemes which are faster, but these schemes are generally not used by or available to competitors.

More recently, a newer control protocol has been defined by the Instrument Society of America (ISA). The new protocol is generally referred to as Fieldbus. Fieldbus is a multi-drop serial digital two-way communications protocol intended for connecting field instruments and other process devices such as monitoring and simulation units in distributed control systems. Fieldbus allows enhanced digital communication over previous process control loop methods while maintaining the ability to power process devices coupled to the Fieldbus loop and while meeting intrinsic safety requirements.

Two reasonably standardized industrial Fieldbus protocols are Foundation Fieldbus and Profibus. The physical layer of the Fieldbus protocols are defined by Instrument Society of America standard ISA-S50.02-1992, and its draft two extension dated 1995. The Fieldbus protocol defines two subprotocols. An H1 Fieldbus network transmits data at a rate up to 31.25 kilobits per second (Kbps) and provides power to field devices coupled to the network. The H1 physical layer subprotocol is defined in Clause 11 of the ISA standard, part two approved in September 1992. An H2 Fieldbus network transmits data at a rate up to 2.5 megabits per second (Mbps), does not provide power to field devices connected to the network, and is provided with redundant transmission media.

Fieldbus provides significant capabilities for digitally communicating immense amounts of process data. Thus, there is a continuing need to develop process control devices capable of maximizing fieldbus communication efficiency.

BRIEF SUMMARY OF THE INVENTION

The present invention provides automatic time stamping of the messages transmitted and received by a device in a network, such as a process control system. The device generates event pulses corresponding to selected events associated with the transmitted and received messages. In response to those event pulses, current timer values within the device are stored as time stamp values.

DETAILED DESCRIPTION

Process Control System Overview

The present invention relates to a communication controller for use in field instruments and other devices of process control systems. The purpose of the communication controller is to perform a substantial portion of the link layer processing of messages and timer management, thereby freeing the application processor or CPU to perform other functions. For the purpose of this detailed description, the communication controller will be described in the context of a system using the Foundation Fieldbus communications protocol, although it has general applicability to packet-based communication protocols.

The fieldbus physical layer defines the electrical characteristics of the physical means of transmission and reception of the communications protocol data in the form of a Physical Layer Protocol Data Unit (PhPDU). In addition, the fieldbus physical layer specifies the symbol encoding, message framing, and error detection method. The ISA fieldbus standard defines three signaling speeds and two modes of coupling. For purposes of this description, the invention will be described in the context of the H1 physical layer defined in clause 11 of ISA S50.02 Standard, Part 2. That clause covers a 31.25 Kbps, voltage mode, wire medium, with a low-power option. This option allows for a device connected to the communications medium to receive its operational power from the communications medium. The physical layer can be capable of meeting the intrinsic safety requirements for hazardous environments. The protocol operates on low-grade twisted pair cable and supports multiple devices, in accordance with the voltage and current limitations which are defined by the standard.

Figure 1:
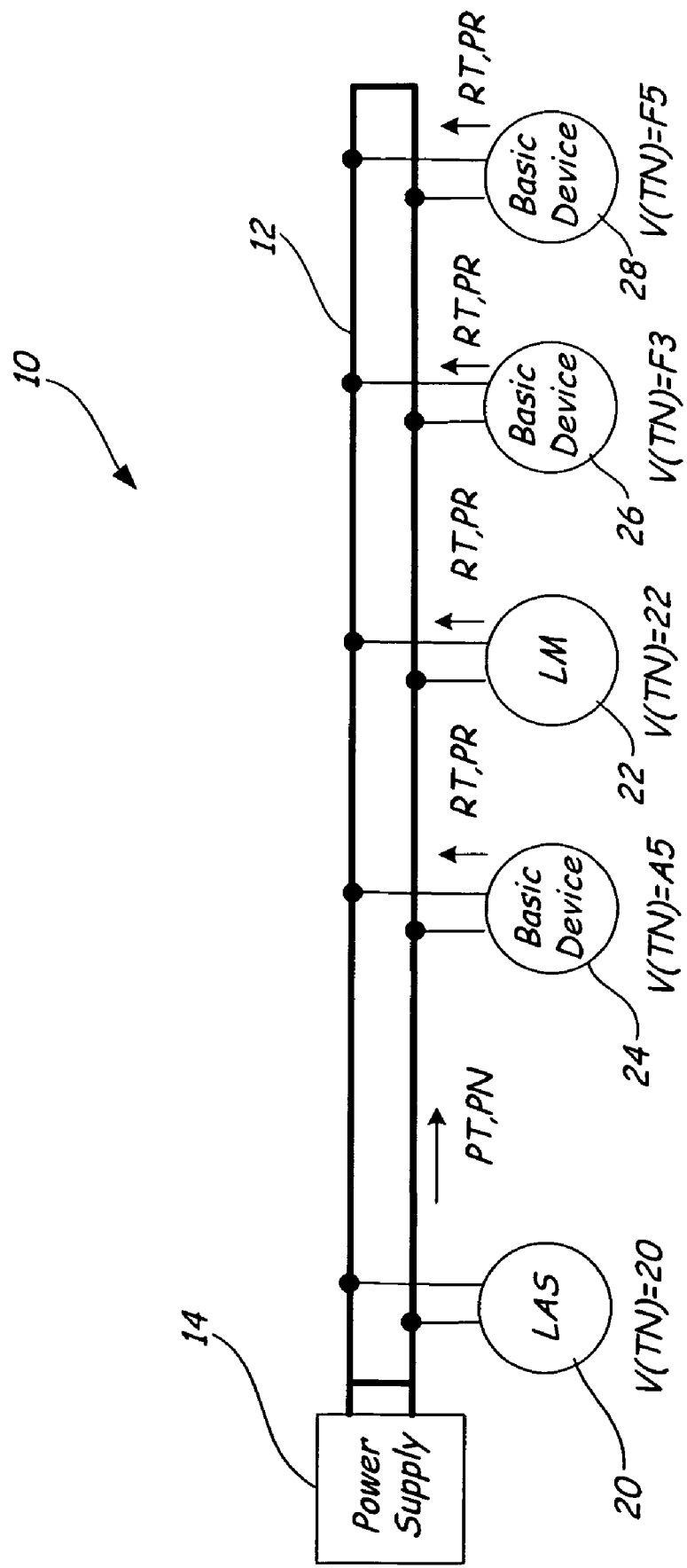
FIG. 1 is a diagram of a process control system with digital communication between devices over a communication medium segment.

FIG. 1 shows a typical process control system 10 including segment 12, power supply 14 and five devices: Link Active Scheduler (LAS) device 20, Link Master (LM) device 22, and basic devices 24, 26, and 28. Segment 12 can support up to thirty-two devices on a single pair of wires. Typically, segment 12 will have from four to sixteen devices, based on loop execution speed, power, and intrinsic safety requirements.

LAS device 20 maintains a central schedule for all the communication between devices on segment 12. LAS device 20 improves the overall communication reliability by sending Compel Data (CD) Data Link Protocol Data Units (DLPDUs) to each device to transmit back cyclic data which is then scheduled to do so. LAS device 20 serves as the local source of Data Link time (DL-time) on segment 12. A DLPDU is the data content of the PhPDU message that is communicated across segment 12.

LM device 22 is configured to take over the responsibilities of LAS device 20 should LAS device 20 fail or become inoperable. Although only LM device 22 is shown in FIG. 1, more than one Link Master device can be present on a segment. This allows for the case if both the Link Active Scheduler and the first Link Master were to fail, then the second Link Master can take over for the Link Active Scheduler. Once the Link Active Scheduler is disabled, the Link Master takes over the functionality of the Link Active Scheduler.

Each device has a unique address called the V(TN), which represents the local node-ID(This_Node). In the example shown in FIG. 1, LAS device 20 has address V(TN)=20; LM device 22 has address V(TN)=22; basic device 24 has address V(TN)=A5; basic device 26 has address V(TN)=F3; and basic device 28 has address V(TN)=F5.

LAS device 20 sends Pass Token (PT) and Probe Node (PN) messages to all devices on segment 12. Each of the other devices (LAS device 22 and basic devices 24, 26, 28) send Return Token (RT) and Probe Response (PR) messages back to LAS device 20, as appropriate.

Each basic device 24, 26, 28 only needs to see its own PT and PN messages that are sent by LAS device 20. PT and PN messages have a designation address (DA) encoded in the second byte of the DLPDU. LAS device 20 passes a token (PT) or probes a node (PN) one at a time to all devices on segment 12.

Once basic device 24, 26, or 28 receives a PT message with a designation address equal to that device's unique address (DA=V(TN)), it then will respond back to LAS device 20 with an RT message. If basic device 24, 26, or 28 receives a PN DLPDU with DA=V(TN), it is required to respond back with a PR message.

The transmission of PT and PN messages from LAS 20 and RT and PR messages to LAS 20 creates several messages on segment 12 that a particular basic device 24, 26, 28 does not need to receive and take action on. Each basic device 24, 26, 28 only needs to respond to PT and PN messages addressed to that particular device. Constantly getting interrupted by PT and PN messages from LAS 20 that are addressed to other devices, as well as RT and PR messages from other devices addressed to LAS device 20, can create undue processing time to handle these "nuisance interrupts." With basic devices 24, 26, and 28, DLPDU filtering can be used to reduce the number of interrupts that the basic device has to process. On the other hand, LAS device 20 must process every message on segment 12.

All devices on segment 12 transmit data onto segment 12 as a Manchester encoded baseband signal. With Manchester encoding, "0" and "1" are represented by transitions that occur from low-to-high and high-to-low, respectively, in the middle of the bit period. For fieldbus, the nominal bit time is 32 microseconds (μsec), with the transition occurring at 16 μsec. The Manchester encoding rules have been extended to include two additional symbols, non-data plus (N+) and non-data minus (N–), wherein no transition occurs during the bit period and the Manchester encoded baseband signal remains high (N+) or low (N–).

Message Format

Figure 2:
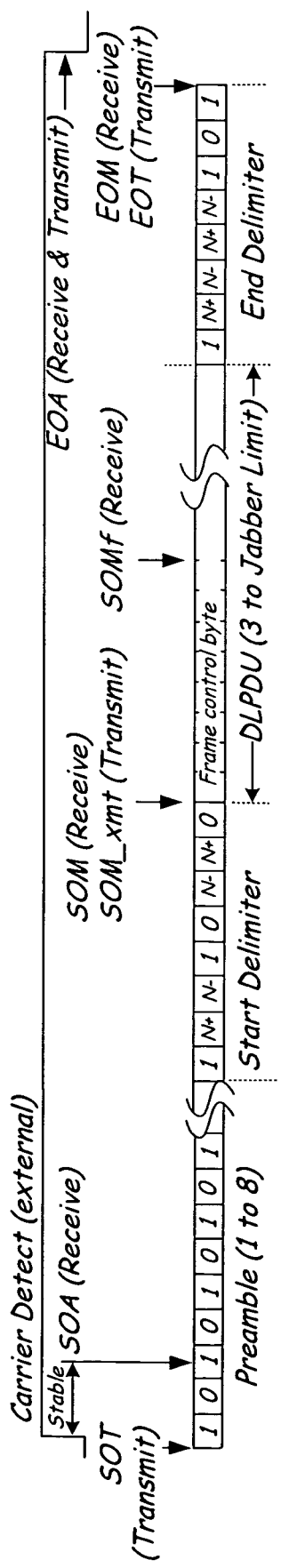
FIG. 2 shows a message format for communications between devices of the process control system of FIG. 1.

FIG. 2 shows the format of a Physical Layer Protocol Data Unit (PhPDU) used to transmit messages over segment 12. The PhPDU includes a preamble, a Start Delimiter (SD) a Data Link Protocol Data Unit (DLPDU) and an End Delimiter (ED). The preamble is the first several bits of the PhPDU message. The fieldbus specification allows for one to eight bytes of preamble. The device receiving the message uses the preamble to synchronize with the incoming message. As shown in FIG. 2, the sequence of the first byte of the preamble is 1 0 1 0 1 0 1 0.

The Start Delimiter (SD) immediately follows the preamble. There is one SD per message. The fieldbus specification requires that the SD have non-character data (N+ and N–), which always appear in the SD message in complementary pairs. This encoding scheme makes the SD unique and impossible to confuse with the data portion (DLPDU) of the message. The sequence shown in FIG. 2 for the SD is 1 N+ N– 1 0 N– N+ 0.

The DLPDU is a variable length message. It contains a Frame Control (FC) byte as its first byte and a Frame Check Sequence (FCS) check sum as its final two bytes. The length of DLPDU is variable, with a minimum of three bytes (in the case of an RT message) up to a jabber limit of, for example, about 300 bytes.

The End Delimiter (ED) follows the DLPDU. It represents the last byte of any PhPDU message transmitted over segment 12. Similar to the SD, the ED includes non-character data in complementary pairs. This encoding scheme makes the ED unique and impossible to confuse with the DLPDU. The sequence shown in FIG. 2 for the End Delimiter is 1 N+ N– N+ N– 1 0 1.

FIG. 2 also shows a Carrier Detect signal. The purpose of the Carrier Detect signal is to indicate when (a) an incoming PhPDU message is present on segment 12 or (b) a device is transmitting a message onto segment 12.

Start of Transmit (SOT) occurs at the moment that a Transmit Enable (TxE) goes active, i.e., when the preamble of a PhPDU message is first presented to segment 12.

Start of Activity (SOA) occurs after the Carrier Detect signal goes active and has been stable for at least one bit time or two bit times (approximately 16 to 32 μsec). This time depends on when the Carrier Detect goes active with respect to the internal clock of the device receiving the message. This allows the communication controller of the device to ignore noise glitches that are most apt to occur at the front end of the preamble. Additional time is used to synchronize with the bit boundaries to eliminate the potential for short noise bursts on segment 12 being misinterpreted as activity. For a transmitted message, SOA occurs once the Transmit Enable goes active (i.e., the preamble of the PhPDU is presented to segment 12).

Start of Message (SOM) occurs at the beginning of the first bit of when the FC byte is detected for a received message.

SOM_xmt is the Start of Message Transmit, which occurs at the beginning of the first bit of when the FC byte is detected for a transmitted message.

SOMf is an SOM of a received filtered DLPDU. This occurs when the communication controller within the device has detected enough information to make the determination that the incoming message is to be filtered.

End of Message (EOM) occurs at the end of the last bit of the ED being encountered in a received message. End of Transmission (EOT) occurs at the end of the last bit of the ED a transmitted message.

End of Activity (EOA) occurs when the Carrier Detect has gone inactive. The EOA occurs for both transmitted and received DLPDUs.

Device Architecture

Figure 3:
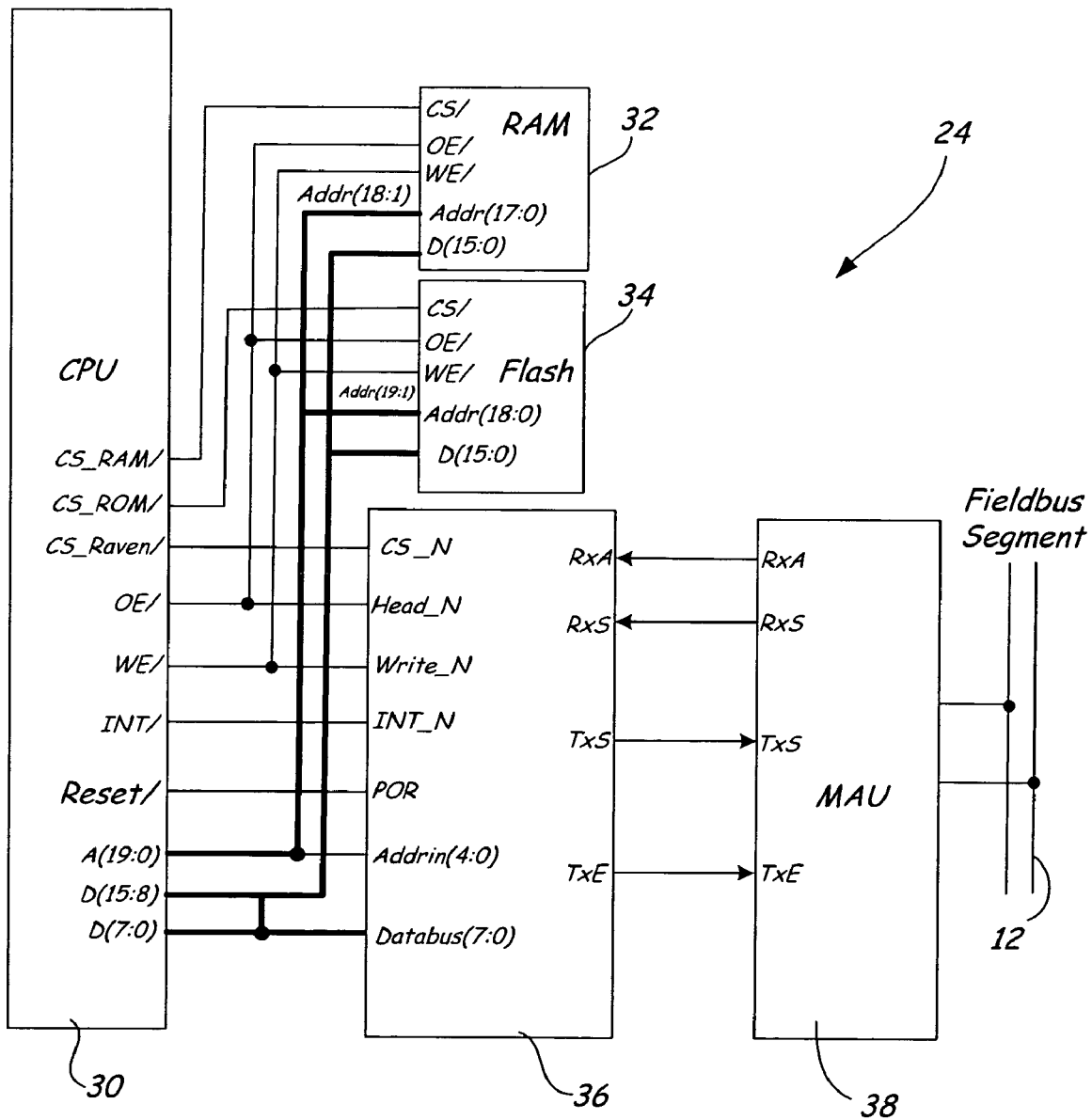
FIG. 3 is a block diagram of a device of the process control system.

FIG. 3 shows a block diagram of the communications portion of basic device 24, which is representative of the architecture in each of devices 20-28. Basic device 24 includes central processing unit (CPU) 30, random access memory (RAM) 32, flash memory 34, communications controller 36, and medium attachment unit (MAU) 38.

In the embodiment shown in FIG. 3, CPU 30 is a microprocessor such as Motorola 68LC302, Motorola Mcore 2075, Motorola PowerPC 850, Atmel Thumb processor AT91M40800 and others. CPU 30 is an 8-bit or higher processor.

In the embodiment shown in FIG. 3, communication controller 36 is an application specific integrated circuit (ASIC) chip that serves as an interface between MAU 38 and CPU 30. It transmits and receives encoded Manchester data to and from external analog circuitry connected to segment 12. After receiving the serial data from MAU 38, communication controller 36 decodes the data, forms the data into bytes, strips off the preamble, SD, and ED, (and, optionally, the FCS bytes) and provides the message data for the link layer to read. For data transmission, communication controller 36 receives bytes of DLPDU data from the link layer and adds the preamble, the SD, optionally generates the FCS, and adds the ED. Communication controller 36 then forms serially encoded Manchester data, which is sent to MAU 38 for transmission on segment 12.

Communication between communication controller 36 and MAU 38 is provided through four signals: RxS, RxA, TxS, and TxE. RxS is the received Manchester Encoded serial data. RxA is the Carrier Detect signal for received data. TxS is the transmitted encoded serial data. TxE is the transmit enable signal.

In other embodiments of the invention, communication controller 36 can be formed on a common integrated circuit with CPU 30. In addition, RAM 32 and flash memory 34 may be combined with CPU 30 in some embodiments. In the case of LAS device 20, CPU 30, RAM 32 and flash memory 34 may be a part of a host computer system of process control system 10.

MAU 38 provides the network connection to segment 12. MAU 38 may be an integrated circuit, or discrete components can be used to form MAU 38.

Communication Controller 36

Figure 4:
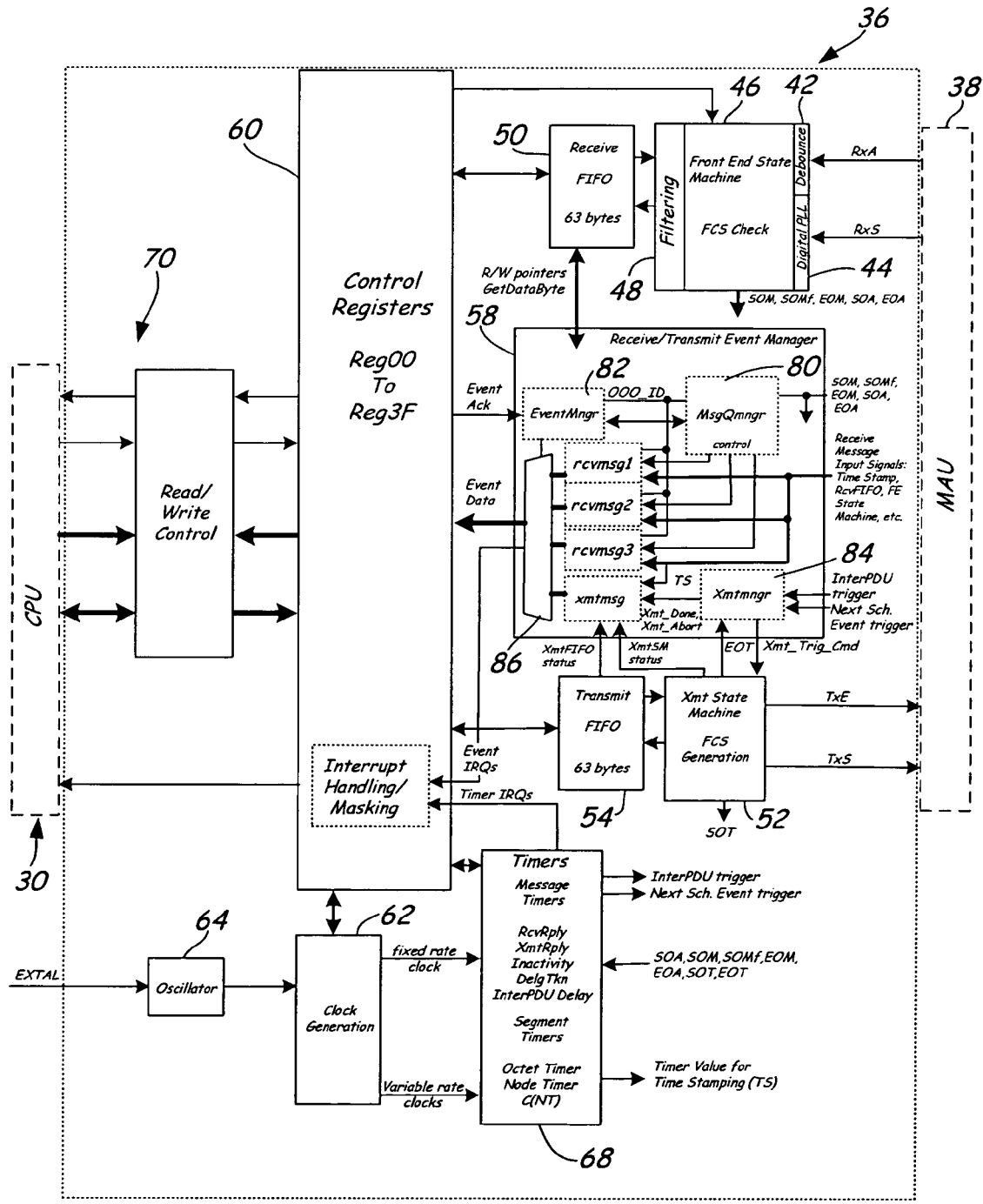
FIG. 4 is a functional block diagram of a communication controller of the device of FIG. 3.

FIG. 4 is a functional block diagram of communication controller 36. In this embodiment, communication controller 36 includes debounce circuit 42, digital phase lock loop (PLL) 44, front end state machine 46, receive message filtering 48, receive first-in-first-out (FIFO) memory 50, transmit state machine 52, transmit FIFO memory 54, receive/transmit event manager 58, registers 60, clock generation circuitry 62, oscillator 64, timers 68, and CPU interface circuitry 70.

When an incoming message is detected by MAU 38, a Carrier Detect signal is provided to communication controller 36 at the RxA input, and the incoming asynchronized Manchester data is provided at the RxS input. The RxA and RxS inputs are presented to front end state machine 46. Digital PLL 44 recovers and regenerates the clock from the incoming serial Manchester encoded data. This regenerated clock is then used to clock front end state machine 46.

Front end state machine 46 detects the incoming serial bit stream RxS. It strips off the preamble, SD, and ED, and stores the DLPDU into receive FIFO memory 50. Front end state machine 46, together with receive message filtering 48, can be configured to filter out specific frame controls, plus Probe Node (PN) and Pass Token (PT) messages addressed to other devices. Front end state machine 46 keeps track of the number of bytes that have been written into receive FIFO memory 50. The FCS is automatically verified at the end of each message, and can be optionally stored into receive FIFO memory 50.

Front end state machine 46 also provides signals representing specific events it has detected. These include the SOM, SOMf, EOM, SOA, and EOA event pulses.

Front end state machine 46 is activated when the RxA line goes active. Front end state machine 46 then synchronizes with the edges of the preamble field and decodes the Manchester encoded data of the RxS signal. The SOA event indicates that front end state machine 46 has started.

Once the preamble has been detected, front end state machine 46 waits for the Start Delimiter (SD) sequence. After the SD has been detected, front end state machine 46 converts the serial data stream into octets, and writes them to receive FIFO memory 50 in 8-bit bytes. Front end state machine 46 continues writing new octets of data into receive FIFO memory 50 until the End Delimiter (ED) is detected, or until receive FIFO memory 50 is full.

When the ED has been detected, front end state machine 46 waits for the RxA line to go inactive, which is indicated by the EOA event.

With the RxA line inactive, front end state machine 46 returns to its initial state. It remains in that initial state until the next activity on fieldbus segment 12 (i.e., until a Carrier Detect signal is provided at RxA again).

Filtering circuitry is used by basic devices to reduce IRQ loading on messages that are not important to the device. In contrast, a device configured as an LAS must receive all messages on the segment and therefore must have filtering disabled. When filtering is disabled, all received messages will be stored in receive FIFO memory 50 and will be passed on to registers 60 and then to CPU 30. SOMf is a Start Of Message signal for a received filtered DLPDU. It occurs when front end state machine 46 has determined that the received message has detected enough information to determine that the incoming message is to be filtered.

With filtering enabled, messages that are filtered are not stored in received FIFO memory 50. For filtered messages, SOMf will not be generated, therefore no event or IRQ will occur.

Examples of filtered messages are Return Token (RT), idle, Request Interval (RI) and Probe Response (PR) DLPDU messages. These are identified based upon the Frame Control (FC) byte and will always be rejected with filtering enabled. Pass Token (PT) and Probe Node (PN) messages will be accepted if the destination address in the message matches the address for the device. If the destination address does not match, then the PT and PN messages are rejected.

The ability to filter message types based on the FC byte and based upon the destination address reduces the software interrupt loading by limiting the number of interrupt requests (IRQs) that CPU 30 must process.

Front end state machine 46 and receive FIFO memory 50 are used to parse the serial data frames from MAU 38. CPU 30 reads the data from receive FIFO memory 50 and places it in its local memory space to decode the received DLPDU.

Receive FIFO memory 50 is 63 bytes by eight bits wide. Receive FIFO memory 50 will store all of the DLPDU bytes up to three complete received messages (up to a total of 63 bytes). Front end state machine 46 decodes the serial data stream from the filtered RxS signal, and converts it to an 8-bit parallel formatted byte. After the formation of the byte, front end state machine 46 creates a write pulse that stores the coded data into the location that is pointed to by a write pointer. After the write operation is complete, the write pointer is incremented to store the next DLPDU byte.

CPU 30 interfaces with a read pointer to receive FIFO memory 50. Any read from the receive FIFO register of registers 60 (which contains the actual DLPDU data) places the 8-bit data from receive FIFO memory 50 immediately onto the data bus for reading by CPU 30. After the read operation is complete, the read pointer is incremented. This can be continued until receive FIFO memory 50 is empty.

To prevent an overflow condition from occurring in receive FIFO memory 50, there is a register within registers 60 that allows an IRQ to be generated if receive FIFO memory 50 is approaching a full condition. The threshold for generating the IRQ is configurable.

Transmit state machine 52 reads the DLPDU data to be transmitted from transmit FIFO memory 54. The preamble, SD, and ED are automatically inserted. To start transmit state machine 52, the interPDU trigger or, optionally, the Next Scheduled Event trigger needs to be activated to commence the transmit operation. Transmit state machine 52 keeps track of the number of bytes that have been transmitted. An error status will be indicated if there is an underflow or transmitted count violation. The FCS can be optionally transmitted automatically as the last two bytes of the DLPDU.

Transmit state machine 52 encodes the Manchester serial data supplied through interface circuitry 70 on the TxS line to MAU 38 to be presented on segment 12. Transmit state machine 52 also asserts the Transmit Enable (TxE) line at the instant that the first bit the first preamble is sent until the last bit of the ED occurs. Transmit state machine 52 also generates the Start Of Transmission (SOT) event signal when it asserts the TxE line, and generates the End Of Transmission (EOT) event signal when the TxE line returns to inactive.

Transmit FIFO memory 54 stores all of the DLPDU bytes that are required for a message to be transmitted, up to a total of 63 bytes. A configurable threshold can be set to send an IRQ telling CPU 30 when transmit FIFO memory 54 is almost empty. In that way, if more than 63 bytes are required to be transmitted, CPU 30 is notified so that it can add more data to transmit FIFO memory 54. This continues until all DLPDU bytes have been written. CPU 30 writes to transmit FIFO memory 54 using a write pointer, while transmit state machine 52 reads bytes from transmit FIFO memory 54 using a read pointer.

Communication controller 36 works on events, and must be capable of handling the occurrence of multiple events. Examples of events include an SOM, EOM, or EOA for a received message or an EOT for a transmitted message. Receive/transmit event manager 58 manages all of the events that occur for up to a total of three received messages and one transmitted message.

As shown in FIG. 4, receive/transmit manager 58 includes three received message objects labeled rcvmsg1, rcvmsg2, and rcvmsg3, and one transmit message object labeled xmtmsg. In addition, receive/transmit manager 58 includes message queue manager (MsgQmngr) 80, event manager (EventMngr) 82, transmit manager (xmtmngr) 84, and event MUX 86.

Receive FIFO memory 50 is capable of storing the DLPDU bytes for up to three complete received messages. Each of those three messages has a corresponding object rcvmsg1, rcvmsg2, and rcvmsg3. Each object contains the status of all of the IRQs, message errors, and time stamping that occur for its corresponding received message. This information constitutes the event data for that message.

The status of all IRQs, message errors, and time stamping that occur for a transmit message are stored in the xmtmsg object. The stored information constitutes the event data for the transmitted message.

MsgQmngr 80 controls the selection and the enabling of the three received message objects. Only one received message object can be active at a time. MsgQmngr 80 allows the events to be associated with the active received message object. In the case of a fourth message being received before the other three messages have been acknowledged by CPU 30, MsgQmngr 80 disables any further messages from being received until the event data has been read or acknowledged.

EventMngr 82 manages the order of occurrence of events. As events occur, event manager 82 assigns each event an order of occurrence identification (OOO_ID). This allows CPU 30 to read the events one at a time as they occur. CPU 30 must acknowledge each event as it occurs. After the first event has been acknowledged, the subsequent event will be ready for CPU 30 to read.

Xmtmngr 84 monitors the InterPDU trigger (InterPDU_trig) and the Next Scheduled Event trigger and initiates the Transmit Trigger Command (Xmt_Trig_Cmd) to transmit state machine 52 to cause the next message to begin to be transmitted.

Communication controller 36 includes registers 60. These registers, designated Reg00-Reg3F, can be written to and read from by CPU 30. Interrupts (IRQs) are also handled through registers 60.

Clock generation circuitry 62 receives an external clock and either uses that clock or the clock signals from its internal oscillator 64 to generate all necessary clock signals for communication controller 36.

Clock generation circuitry 62 preferably has the capability of currently adjusting both its node timer and its octet timer clock rates. This allows communication controller 36 to synchronize the relationship of its Node Time with the Link Address Scheduler (LAS 20). Octet Time is used for internal message timing, while Node Time is used to share a common sense of time across segment 12.

Timer 68 will be divided into two groups, representing different senses of time. A first set of timers, called segment timers, operates based on a variable clock rate produced by clock generation circuitry 62 under software control from CPU 30. A second set of timers, called message timers, operates on a fixed rate clock.

There are two segment timers in communication controller 36. The first segment timer is a Node Timer, which has a clock tick rate of 31.25 μsec (32 kHz). The Node Timer is used to implement the Next Function Block Execution Time, Link Schedule Time V(LST), and Data Link Time (DL-Time).

The second segment timer is the Octet Timer, which has a clock tick rate of 2 μsec (500 kHz). The Octet Timer is used for the Next Scheduled Event trigger (which interfaces to transmit state machine 52 for transmitting messages at a specific time). When the clock rate is adjusted, the Node and Octet timers will track one another at the same rate. This is because the clock signals driving the Node Timer and the Octet Timer are derived from a common variable clock.

The message timers are started and stopped based upon fieldbus message events (transmit and receive). The message timers include an inactivity timer, an interPDU delay timer, a receive reply timer, a transmit reply timer, a delegated token recovery timer.

The inactivity timer is a decrementing counter. It is used for measuring the idle time between two PhPDUs. The inactivity timer works on both filtered and non-filtered received messages as well as any transmitted messages on segment 12. When commanded to start, the inactivity timer will decrement every 16 μsec. The inactivity timer starting point is determined from a configurable set point preloaded into one of registers 60. The decrementing of the inactivity timer can be cancelled or stopped via events that are related to either a received or transmitted message. If the timer ever reaches 0 or expires, an IRQ will be generated. The inactivity timer will remain at 0 until the IRQ is acknowledged. If the IRQ remains high, no additional message events that occur will effect the inactivity timer until this IRQ is acknowledged.

The interPDU delay timer is an incrementing counter. It is used in conjunction with a V(MID) threshold register to implement the fieldbus V(MID) minimum-interPDU delay that insures a minimum time duration (or gap time) of non-transmission between a transmitted or received message. The interPDU timer is affected by both filtered and non-filtered received messages as well as any transmitted messages on the segment 12. When there is no fieldbus activity, the interPDU timer will continuously increment. Once the count value equals or exceeds a predetermined value stored in one of registers 60, the InterPDU trigger signal will go active. This signal is used for determining that the interPDU delay time has been met. This signal interfaces to xmtmngr 84 to give the command that a transmitted DLPDU can commence.

The receive reply timer is a decrementing counter. It is used to allow a subscribing device to monitor for an immediate response to a Compel Data (CD) DLPDU. It is also used for a device to monitor its own address when coming online. When commanded to start, the receive reply timer will decrement every 16 μsec. The receive reply timer starting point is determined from a configurable 16-bit set point preloaded into one of registers 60. The decrementing of the receive reply timer can be cancelled or stopped via either a SOM or SOT event. If the receive reply timer ever reaches 0 or expires, an IRQ will be generated. The receive reply timer will remain at 0 until the IRQ is acknowledged. If the IRQ remains high, no additional message events that occur will affect the receive reply timer until this IRQ is acknowledged.

The transmit reply timer is a decrementing counter. It allows a device to monitor for an immediate response after transmitting one of several DLPDUs (e.g., compel data, pass token). When commanded to start, the transmit reply timer will decrement every 16 μsec. The transmit reply timer starting point is determined from a configurable set point preloaded into one of registers 60. The decrementing of the transmit reply timer can be cancelled or stopped via either a SOM event or SOT event of any transmitted DLPDU except that of a Probe Node (PN). If the transmit reply timer ever reaches 0 or expires, an IRQ will be generated. The transmit reply timer will remain at 0 until the IRQ is acknowledged. If the IRQ remains high, no additional message events that occur will affect the transmit reply timer until this IRQ is acknowledged.

The delegated token recovery timer is a decrementing counter. It is used for monitoring the idle time of receiving a delegated token from another device. The delegated token recovery timer works on both filtered and non-filtered received messages as well as any transmitted messages on segment 12. When commanded to start, the delegated token recovery timer will decrement every 16 1sec. The delegated token recovery timer starting point is determined from a configurable set point preloaded into one of registers 60. The decrementing of the delegated token recovery timer can be cancelled or stopped via events that are related to either a received or transmitted message. If the delegated token recovery timer ever reaches 0 or expires, an IRQ will be generated. The delegated token recovery timer will remain at 0 until this IRQ is acknowledged. If the IRQ remains high, no additional message events that may happen to occur will affect the delegated token recovery timer until this IRQ is acknowledged.

Automatic Time Stamping

Communication controller 36 performs automatic time stamping of events so that an accurate sense of time can be maintained and used within communication controller 36 and CPU 30, as well as in other devices connected to segment 12. As illustrated in FIG. 1, process controller system 10 has messages that are constantly being transmitted and received between devices 20-28 that are actively connected to segment 12. As discussed previously, at the physical layer each message consists of a Physical Layer Protocol Data Unit (Ph-PDU). There are particular events associated with receiving and transmitting PhPDUs that require time information. With the present invention, automatic time stamping occurs within communication controller 36 by capturing snapshots of segment timers on the occurrence of specific events.

Associated with a received PhPDU is the Start Of Activity (SOA) event. The occurs when the received PhPDU activity has been detected by front end state machine 46. Another event associated with a received PhPDU is the End Of Message (EOM) event. This occurs at the end of the end delimiter (ED). The EOM event generates an interrupt request (IRQ) to the software running on CPU 30 to indicate that a received message has occurred. Receive/transmit event manager 58 is responsible for providing the event IRQ's, through registers 60, to CPU 30.

Associated with a transmitted PhPDU is the End Of Transmit (EOT) event. This occurs when the transmitted PhPDU has finished being transmitted to the network, i.e. at the end of the ED. The EOT event causes receive/transmit event manager 58 to generate an interrupt request (IRQ) to the software in CPU 30 to indicate that the transmitted message has been completed.

It is important for the software in CPU 30 to know the time when each event occurred for both received and transmitted messages. One complication is that there are two senses of time that the software uses: the DL-Time (Data Link Time) and the Octet Time. Both are monitonically increasing counts. These two senses of time require different clock rates for their time base. The DL Time is based on an adjustable clock rate of approximately 32 KHz (31.25 μsec), while the Octet Time is based on an adjustable clock rate of approximately 500 KHz (2 μsec).

Although software in CPU 30 could determine event time values after getting an IRQ for either an EOM or EOT event, there is a software latency representing the time from the IRQ generation to the time when the software can actually read the DL-Time or the Octet Time. This can vary depending on the task that the software is currently performing when the IRQ occurs. In addition, there is overhead required for software to take a time reading from one of the timers and then convert the value to the other time base, since time values for both time bases are required by the software.

Another problem exists in that there is no IRQ for the SOA event. The reception of the SOA is an asynchronous event. Having an IRQ for the SOA is problematic because a noise burst on segment 12 can cause an SOA event to be detected. The software in CPU 30 could easily become overloaded responding to unnecessary SOA IRQs caused by a noisy segment 12.

It would also be problematic for software to calculate the time when the SOA actually occurred, since the number of preamble bytes is not known. An IRQ could be generated at the Start Of Message (SOM) event, which is the point in time when the start of the received DLPDU has been detected. But with the preamble being a minimum of one byte to a maximum of 8 bytes, this value could range from 256 microseconds to 2,048 microseconds.

Controller 36 provides hardware needed to precisely and automatically time stamp the received and transmitted PPDU events for both DL-Time and Octet Time.

Figure 5:
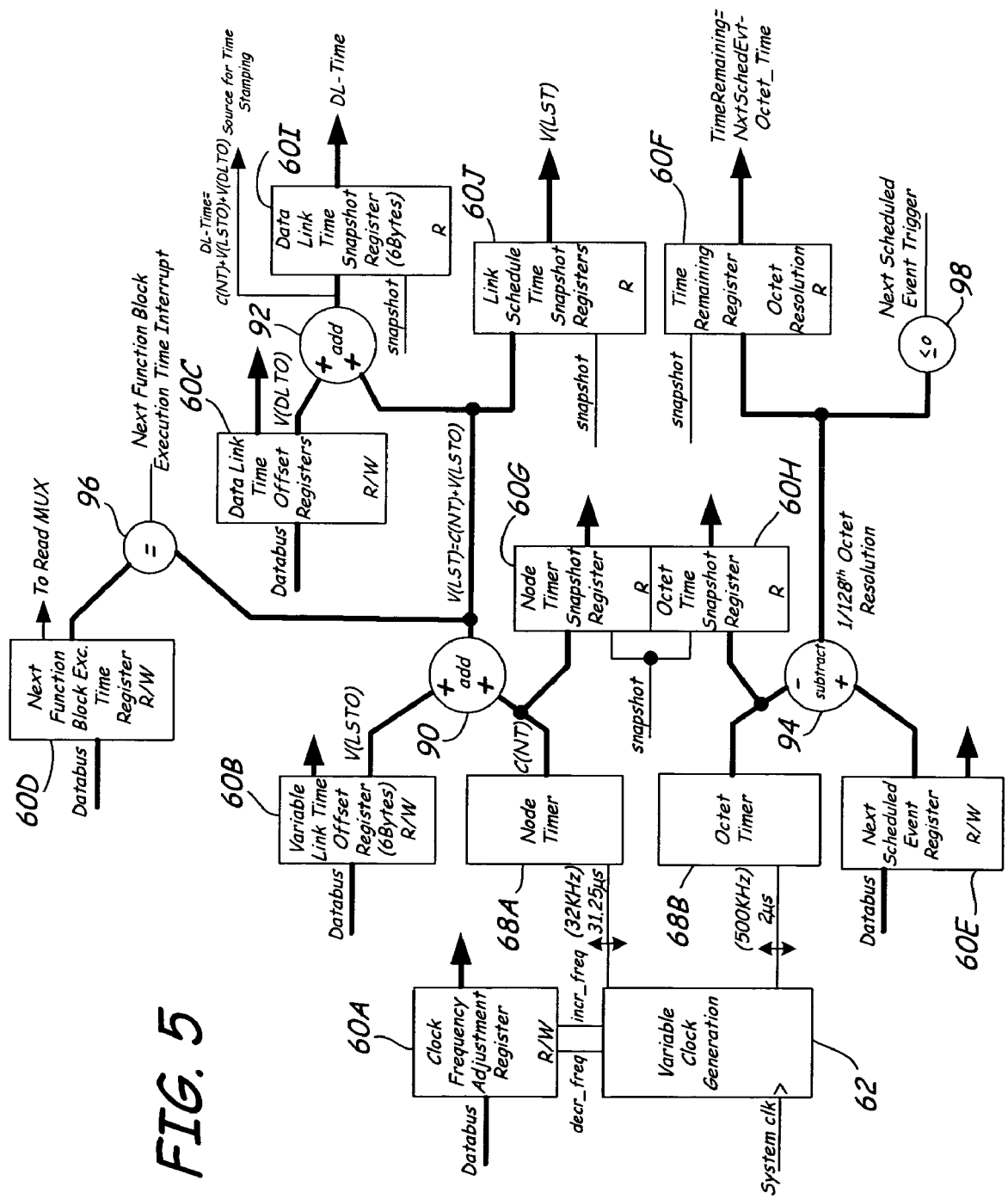
FIG. 5 is a functional block diagram of clock generation, segment timers and registers used to perform automatic time stamping in the communication controller of FIG. 4.

FIG. 5 is a functional block diagram illustrating the automatic time stamping function using the two segment timers, Node Timer 68A and Octet Timer 68B. Shown in FIG. 5 are variable clock generation circuitry 62, clock frequency adjustment register 60A, Variable Link Timer Offset register 60B, Data Link Time Offset register 60C, Next Function Block Execution Time register 60D, Next Scheduled Event register 60E, Time Remaining register 60F, and Snapshot registers 60G-60J, adders 90 and 92, subtracter 94 and comparators 96 and 98.

Node timer 68A and Octet timer 68B are the segment timers used to provide two different senses of time. The clock signals for Node Timer 68A and Octet Timer 68B are provided by variable clock generation circuit 62 under the control of clock frequency adjustment register 60A. The frequency of both the two clock signals are controlled in order to synchronize the clock rate used by the device (in this case, basic device 24) with the clock rate of LAS 20.

Node Timer 68A is a monotonically increasing timer operating on the 32 KHz clock signal. The count in Node Timer in 68A is used to produce Node Time C(NT), Data Link Time (DL-Time), and the Link Schedule Time V(LST). Another key use of Node Timer 68A is in generation of the Next Function Block Execution Time interrupt.

Octet Timer 68B is a monotonically increasing timer that operates on the 500 KHz clock signal and is based on octets. One of the key uses of Octet timer 68B is for the creation of the Next Scheduled Event trigger.

Variable Link Time Offset register 60B provides a value V(LSTO) that represents the signed offset (or difference) of the particular device (in this example, device 24) with respect to the local Link Scheduling Time V(LST) of LAS 20. The time reference of LAS 20 is determined when a TD DLPDU is received from LAS 20. The value from Variable Link Time Offset register 60B is added to the count value from Node Timer 68A to produce the local Link Schedule Time V(LST) for device 24.

Data Link Time Offset register 60C contains the data link time offset V(DLTO) which is used by device 24 to correct for any differences between the DL-Time of LAS 20 and that of device 24. LAS 20 transmits the variable V(DLTO) to all devices via the TD DLPDU. DL-Time is formed by adder 92, which adds the value of V(DLTO) to the value of V(LST). The resulting addition forms the local DL-Time for device 24. Next Function Block Execution register 60D allows a configurable method to initiate an interrupt to CPU 30 for when the Next Function Block is to be transmitted. This is accomplished by a comparison by comparator 96 of V(LST) with the setpoint stored in register 60D.

The Next Scheduled Event register 60E provides a configurable method to transmit a DLPDU at a predetermined time that is based off the Octet Time maintained by Octet Timer 68B. The trigger mechanism is implemented by performing a subtraction of Next Scheduled Event register 60E and Octet Time in subtractor 94. After the Next Scheduled Event set point has been written in Next Scheduled Event register 60E, a request for transmit can be performed. Once the difference between the value in register 60E and the Octet Time in Octet timer 68B is equal to or less then 0, a Next Scheduled Event trigger is generated. This signal is provided to xmtmngr 84 of Receive/Transmit Event Manager 58. It initiates the command to transmit a DLPDU onto segment 12. Timer Remaining register 60F allows CPU 30 to determine the time remaining before a Next Scheduled Event trigger is to be initiated.

Snapshot registers 60G-60J, when triggered by software, store the Node Time C(NT), the Octet Time, Data Link Time (DL-Time), and the local Link Schedule Time V(LST). The moment when the snapshot pulse occurs, all four time values will be captured simultaneously. Timers 68A and 68B will continue to count, but the snapshot time values for the event of interest will be captured in registers 60G-60J.

The automatic time stamp feature for a received PhPDU operates as follows. First, debounce circuit 42 and digital phase lock loop 44 (see FIG. 4) sense fieldbus activity of sufficient duration so that front end state machine 46 begins sampling the incoming Manchester formatted data. Digital phase lock loop 44 locks in on the bit boundaries in the preamble of the PhPDU for sampling and decoding of the Manchester data. At the instant that front end state machine 46 is commanded to start decoding data, an SOA pulse event is generated.

The SOA event pulse is used as a snapshot pulse to capture the current values of Octet Time and DL-Time into their respective SOA time stamp registers. These registers are contained in the rcvmsg1, rcvmsg2, or rcvmsg3 objects in Receive/Transmit Event Manager 58.

At the completion of receiving all of the bytes of the DLPDU, front end state machine 46 detects the unique sequence of the End Delimiter ED. At the end of the ED, an EOM event pulse is produced and the EOM IRQ is activated.

The EOM event pulse creates a snapshot pulse to capture the current DL-Time and Octet Time. The time values are stored in their respective EOM time stamp registers, located in received message objects rcvmsg1, rcvmsg2, or rcvmsg3.

The EOM IRQ is supplied through registers 60 to CPU 30. The EOM IRQ interrupts the software running in CPU 30. At that point, the software can select either the DL-Time or Octet Time time base of the time stamp storage registers read as required.

The process of generating automatic time stamps with a transmitted PhPDU is as follows. Software in CPU 30 loads into transmit FIFO memory 54 a DLPDU to be transmitted. Software also loads a register with a count value N representing the number of DLPDU bytes to be transmitted. Software then initiates the transmit request of the DLPDU.

Once the conditions are met to transmit onto segment 12, transmit state machine 52 begins transmitting the PhPDU sequence: preamble bytes, the SD byte, N bytes of DLPDU, and finally the ED byte. As the ED finishes being transmitted, the EOT event pulse and the EOT IRQ are generated. The EOT event pulse acts as a snapshot trigger which stores the current values of the Octet Time and Data Link Time (DL-Time), into their respective EOT time stamp registers. These are located in the xmtmsg object in Receive/Transmit Event Manager 58.

The EOT IRQ interrupts the software. The software can then select data to be read from the appropriate time stamp storage registers as required.

The automatic time stamping of the PhPDU events eliminates software latency which would be required if were necessary to first respond to either an EOM IRQ or an EOT IRQ, and then have the software determine current time. In addition, the automatic time stamp feature allows SOA time stamps in both time bases to be generated, which captures the current time of an asynchronous event.

By performing automatic time stamping in communication controller 36, the accuracy of the time stamp values is increased. Since communication controller 36 is directly handling the PhPDU, it knows exactly when the relevant PhPDU events occur, and acts immediately to capture the current segment time corresponding to those events.

Communication controller 36 provides another automatic time stamping feature. This involves automatic transmission of time stamp data. There are three types of messages that, when transmitted, require time stamp data to be included within the DLPDU data. Communication controller 36 has the ability to automatically insert and transmit the time stamp for these three specific DLPDUs, which are the time distribution (TD), Round Trip Delay Query (RQ), and Round Trip Delay Reply (RR) DLPDUs.

Figure 6:
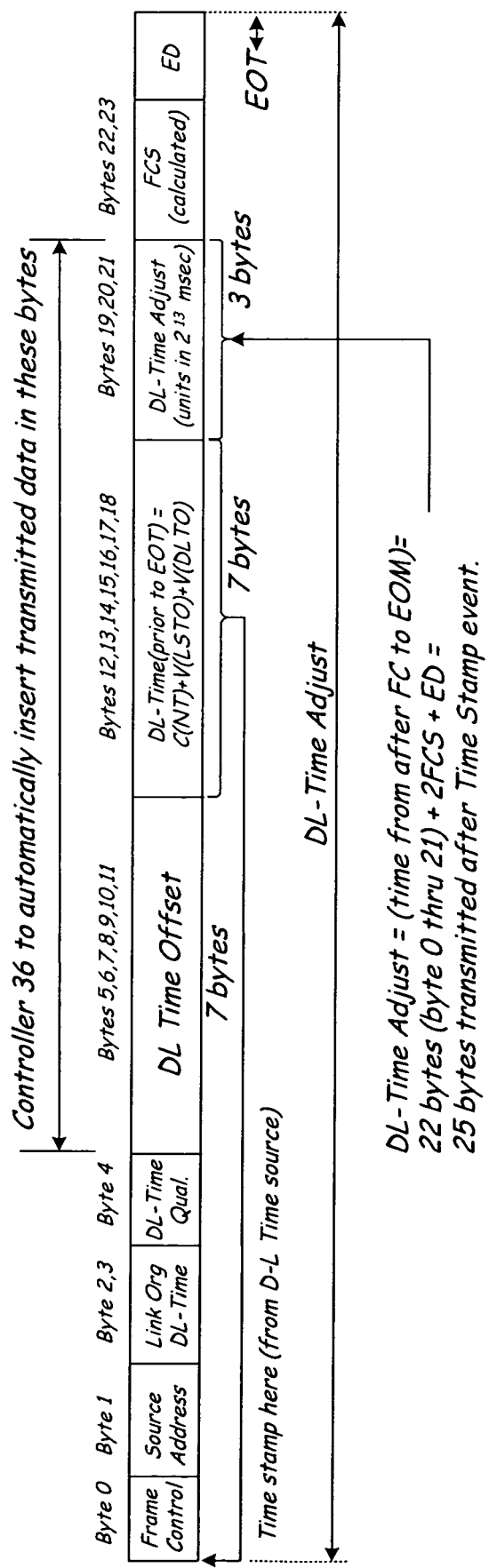
FIG. 6 is a diagram showing a message format for a Time Distribution (TD) Data Link Protocol Data Unit (DLPDU) continuing an automatic time stamp.

The TD DLPDU is transmitted by LAS 20 to enable all other devices on segment 12 to coordinate and to synchronize the rates of advance of their senses of DL-Time. The TD DLPDU shown in FIG. 6, is required to transmit a seven byte time stamp of the DL-Time prior to end of transmission. This time stamp is taken at the moment the TD DLPDU is presented to the local link. This is at the beginning of the Frame Control (FC) byte.

Figure 7:
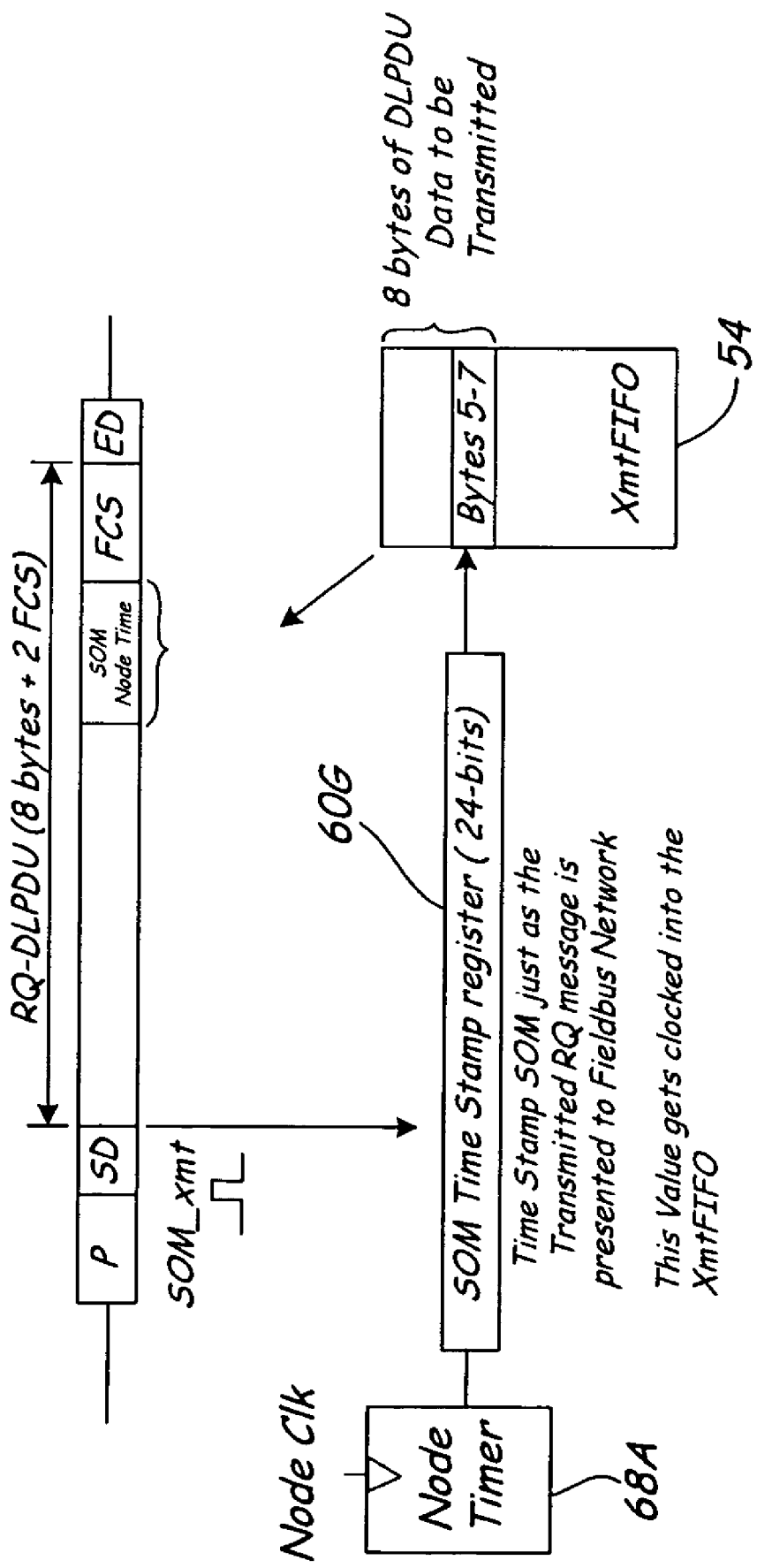
FIG. 7 is a diagram showing a message format for a Round Trip Delay Query (RQ) DLPDU with an automatic time stamp.

The RQ DLPDU is sent from one device to another and is used to initiate the measurement and computation of the round trip delay that is intrinsic to intercommunication between devices. FIG. 7 shows the RQ DLPDU structure and the source of the automatic time stamp. The RQ DLPDU is required to transmit a 24-bit time stamp of the Node Time C(NT) taken at the moment when the DLPDU is presented to the local link. The format of the 24-bit time stamp is Node Time (15:0) plus "00000000". This occurs at the end of the Start Delimiter (SD) and is referred to as the Start Of Message (SOM_xmt) event pulse.

As shown in FIG. 7, the RQ DLPDU contains 8 bytes of data plus 2 bytes of FCS. The 24-bits of SOM Node Time represents bytes 5-7 in the RQ DLPDU.

Figure 8:
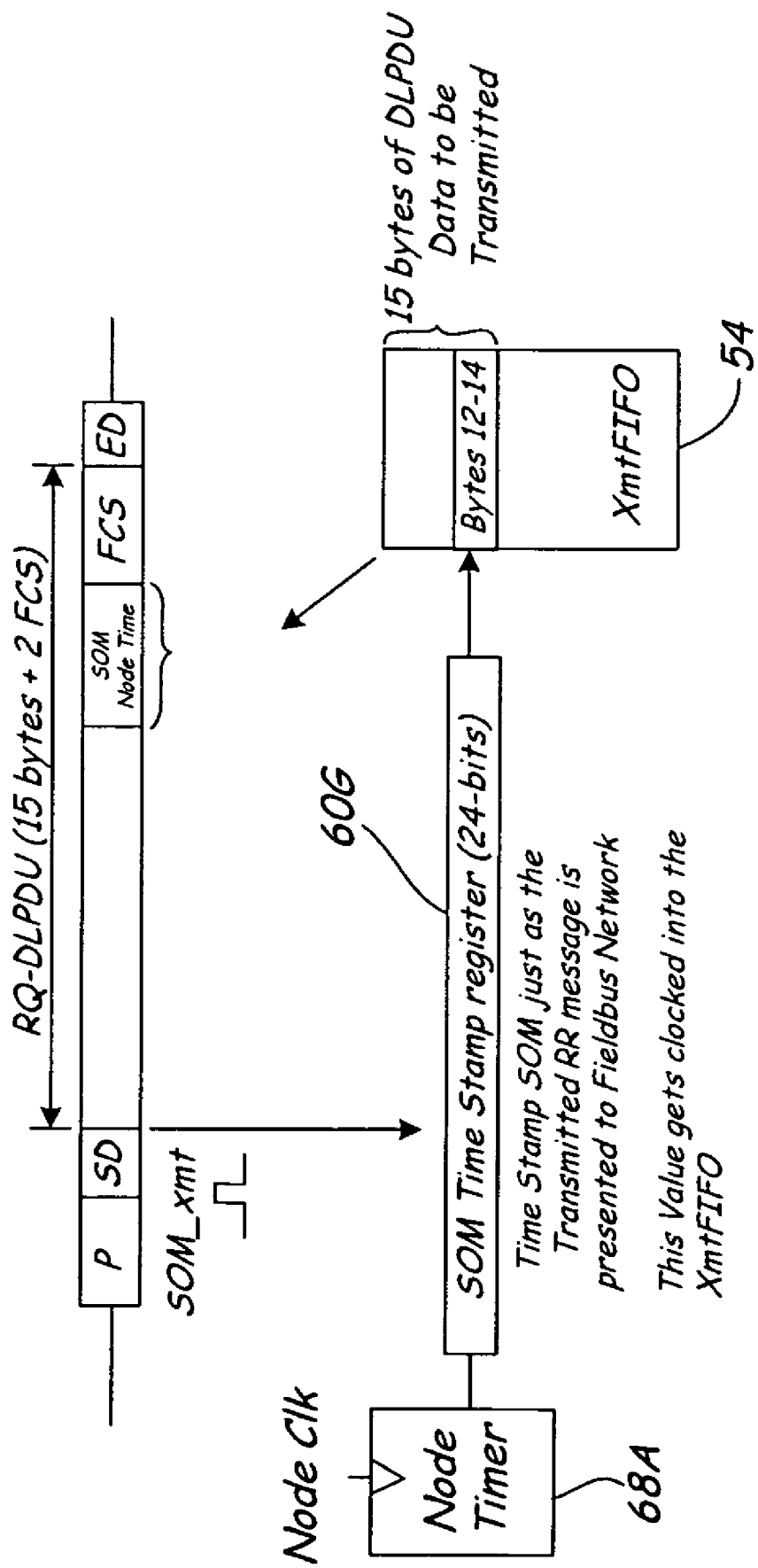
FIG. 8 is a diagram showing a message format for a Round Trip Delay Reply (RR) DLPDU with an automatic time stamp.

The RR DLPDU is used to allow the completion of the measurement and computation of the round trip delay intrinsic to the intercommunication between two individual devices on segment 12. An RQ DLPDU is always followed by an RR DLPDU. They are compliments of each other. The RR DLPDU, which is shown in FIG. 8, is required to transmit a 24-bit time stamp of the Node Time taken at the moment the DLPDU is presented to the local link. The 24 bits are stored in bytes 12-14 of the transmit FIFO memory 54. The format of the 24-bit time stamp is Node Time (15:0) plus "00000000".

Communication controller 36 automatically detects which DLPDU is being transmitted onto segment 12. It stores the time stamp value to be transmitted at the instant that the DLPDU is placed onto segment 12. It properly loads and encodes the stored time stamp value into transmit FIFO memory 54.

The automatic time stamping of TD, RQ and RR DLPDUs begins when software loads a TD, RQ, or RR DLPDU into transmit FIFO memory 54. Software also loads a register with the count value of the number of DLPDU bytes to be transmitted. This value varies depending on the type of DLPDU. Software then initiates the transmit request of the DLPDU.

Once segment 12 has been quiet for the proper amount of time, transmit state machine 52 can begin transmission. As transmission starts, transmit state machine 52 proceeds to transmit the one to eight bytes of preamble, a one byte Start Delimiter (SD), the N bytes for the DLPDU plus two bytes of frame check control, and the final one-byte End Delimiter (ED). During the period of time when DLPDU data is being transmitted, transmit state machine 52 reads the 8-bit data from transmit FIFO memory 54. Before each byte is transmitted, it has to be converted to serial data via a parallel-to-serial converter.

Communication controller 36 monitors both the current state of transmit state machine 52 along with the data in transmit FIFO memory 54 shifted out for transmission via the parallel-to-serial converter. At the moment the first byte of the DLPDU is to be transmitted, transmit state machine 52 produces a transmit Start Of Message (SOM_xmt) event pulse.

The first byte of the DLPDU is always the Frame Control byte (FC) shown in FIG. 6. The FC designates which type of DLPDU is being sent. Depending on which type of DLDPU is being sent, a TD_flag, RQflag or RR_flag may be set. Only one flag can be set per transmitted DLPDU. If the DLPDU being transmitted does not match the TD, RQ or RR frame control (FC) byte, none of the above flags are set.

Within a short period of time from when the flag is set, the frame control data is presented onto segment 12. At that instant, transmit state machine 52 generates the transmit Start Of Message (SOM_xmt) (see FIG. 2) event pulse that causes a snapshot to be taken of Node Time and DL-Time. Using the SOM_xmt pulse gives a very precise value of the Node Time and DL-Time of the transmitting device when the data is presented onto segment 12. If the TD_flag has been set, a 48-bit time stamp of the DL-time is made and stored in a temporary register. If either the RQflag or RR_flag is set, a 24-bit formatted time stamp of the Node Time is stored in another temporary register.

After the time stamp value is stored, a clock pulse is generated to transfer the stored time stamp data into transmit FIFO memory 54. This happens well before the time stamp data needs to be transmited onto segment 12.

The TD, RQ and RR DLPDUs each require that the time stamp value be transferred into a different memory location of transmit FIFO memory 54. This is accomplished by using the TD, RQ or RR flag that has been set to multiplex the appropriate time stamp data into the proper memory location within transmit FIFO memory 54. Whatever value the software had originally written into that location of transmit FIFO memory 54 is overwritten with new the time stamp value.

Finally, the End Of Transmit IRQ will interrupt the software on CPU 30 when the DLPDU has been sent. Software has not participated, however, in the time stamp generation. Rather, the generation of time stamp data has been performed automatically by communication controller 36.

Automatic time stamping in communication controller 36 eliminates the software overhead required to do all the calculations and encoding of the time stamp data. Performing the automatic time stamp function in hardware within communication controller 36 also greatly increases the accuracy of the time stamp values. Since the communication controller knows exactly when the beginning of the first byte of the DLPDU is being presented to the local link, it can capture time stamp at the appropriate instant of time.

Although the present invention has been described with reference to preferred embodiments, workers skilled in the art will recognize the changes may be made in form and detail without departing from the spirit and scope of the invention.

The invention claimed is:

1. A device for communicating over a communication medium, the device comprising:
   a medium attachment unit (MAU) for receiving and transmitting messages on the communication medium;
   a central processing unit (CPU) for processing data contained in messages received and creating data to be contained in messages to be transmitted; and
   a communication controller for interfacing between the MAU and the CPU, the communication controller producing event pulses corresponding to events associated with received and transmitted messages and automatically storing time stamp values in response to the event pulses, wherein the communication controller includes a first timer for providing a first time value and a second timer for providing a second time value of higher resolution than the first time value, wherein the first time value represents a sense of time of the device on the communication medium and the second time value represents an internal time of the device.

2. The device of claim 1 wherein the communication controller inserts a stored time stamp value into a message being transmitted.

3. The device of claim 2 wherein the event pulses include a start of message event pulse and wherein the stored time stamp value inserted into the message represents a local time of the device when the start of message event pulse occurred.

4. The device of claim 2 wherein the communication controller detects what type of message is being transmitted and selects a location within the message for insertion of the time stamp value based on the type of message.

5. The device of claim 1 wherein the event pulses include an end of message event pulse produced by the communication controller when a received message ends.

6. The device of claim 1 wherein the event pulses include an end of transmission event pulse produced by the communication controller when a transmitted message ends.

7. The device of claim 1 wherein the event pulses include a start of activity event pulse produced by the communication controller when a received message starts to be decoded.

8. The device of claim 1 wherein, in response to the event pulses, the communication controller stores time stamp values derived from both the first and the second timers.

9. The device of claim 1 wherein the first timer is a Node Timer that provides Node Time as the first time value.

10. The device of claim 9 wherein, based on the Node Time, the communication controller derives a Data Link Time and a Link Schedule Time.

11. The device of claim 10, wherein the communication controller stores in register the Node Time, Data Link Time and Link Schedule Time as time stamp values in response to the event pulses.

12. The device of claim 1 wherein the second timer is an Octet Timer that produces an Octet Time as the second time value.

13. The device of claim 1 wherein the communication controller simultaneously generates a plurality of time values, and stores each of the time values as a time stamp value in response to one of the event pulses.

14. A method of time stamping messages exchanged between devices over a network, the method comprising:

transmitting and receiving messages over a network;

generating a first timer value that changes at a first clock rate, wherein the first timer value represents a sense of time of a device on the network;

producing event pulses corresponding to selected events associated with transmitted and received messages;

generating a second timer value that changes at a second clock rate that is higher than the first clock rate, wherein the second timer value represents an internal time of the device;

storing a first time stamp value representing the first timer value when one of the event pulses is produced; and storing a second time stamp value representing the second timer value when one of the event pulses is produced.

15. The method of claim 14 wherein the first and second clock rates are variable and synchronized.

16. The method of claim 14 and further comprising:
inserting the first time stamp value into a message being transmitted.

17. The method of claim 16 wherein the event pulses include a start of message event pulse and wherein the first time stamp value inserted into the message represents a local time of the device when the start of message event pulse occurred.

18. The method of claim 16 and further comprising:
detecting what type of message is being transmitted; and
selecting a location within the message for insertion of the time stamp value based on the type of message.

19. The device of claim 14 wherein the event pulses include an end of message event pulse produced when a received message ends.

20. The device of claim 14 wherein the event pulses include an end of transmission event pulse produced when a transmitted message ends.

21. The device of claim 14 wherein the event pulses include a start of activity event pulse produced when a received message starts to be decoded.

22. A method of time stamping messages transmitted and received by devices over a process control network, the method comprising:

synchronizing in each device a first timer that provides a local internal sense of time with a second timer that provides a node sense of time on a segment of the network;

producing event pulses when events associated with the messages occur; and transferring time stamp values corresponding to the local and node senses of time to snapshot registers when an event pulse occurs.

23. The method of claim 22, wherein the event pulses include an End of Message (EOM) pulse, an End of Transmission (LOT) pulse, a Start of Activity (SOA) pulse, and a Start of Transmission (SOT) pulse.

* * * * *

UNITED STATES PATENT AND TRADEMARK OFFICE
CERTIFICATE OF CORRECTION

PATENT NO. : 7,689,687 B2
APPLICATION NO. : 10/903317
DATED : March 30, 2010
INVENTOR(S) : Brian A. Franchuk and Roger R. Benson Page 1 of 1

It is certified that error appears in the above-identified patent and that said Letters Patent is hereby corrected as shown below:

Col. 18, Line 25
 Delete "LOT"
 Insert --EOT--

Signed and Sealed this
Seventh Day of June, 2011

David J. Kappos
*Director of the United States Patent and Trademark Office*